(12) United States Patent
Mondini

(10) Patent No.: US 6,435,079 B2
(45) Date of Patent: Aug. 20, 2002

(54) MACHINE FOR PREPARING FOOD PRODUCTS

(75) Inventor: Giovanni Mondini, Cologne Bresciano (IT)

(73) Assignee: G. Mondini S.p.A., Cologne (IT)

( * ) Notice: Subject to any disclaimer, the term of this patent is extended or adjusted under 35 U.S.C. 154(b) by 0 days.

(21) Appl. No.: 09/910,814

(22) Filed: Jul. 24, 2001

(30) Foreign Application Priority Data

Aug. 1, 2000 (IT) .......................... MI00A1790

(51) Int. Cl.$^7$ .............................. A23L 1/00; A23L 1/16; A21D 6/00; A21C 9/04; A21C 9/08
(52) U.S. Cl. ........................ 99/450.2; 99/353; 99/450.6; 425/6; 425/110; 425/112; 425/131.1
(58) Field of Search ............. 99/353–355, 450.1–450.8, 99/494, 479, 483, 386, 443 R, 443 C; 425/6, 110, 112, 308, 131.1; 426/523, 502, 302, 94, 275, 297, 517, 138, 512, 514, 496, 451, 231

(56) References Cited

U.S. PATENT DOCUMENTS

| | | | |
|---|---|---|---|
| 3,670,665 A | | 6/1972 | Levi |
| 3,901,137 A | * | 8/1975 | Jimenez ........................ 99/353 |
| 3,946,656 A | * | 3/1976 | Hsu ........................... 99/450.1 |
| 4,014,254 A | * | 3/1977 | Ohkawa ..................... 99/450.1 |
| 4,047,478 A | * | 9/1977 | Trostmann et al. ........ 99/450.1 |
| 4,334,464 A | * | 6/1982 | Shinriki ..................... 99/450.2 |
| 4,388,059 A | * | 6/1983 | Ma ........................... 425/112 X |
| 4,439,124 A | * | 3/1984 | Watanabe ................ 425/112 X |
| 4,457,225 A | * | 7/1984 | Bakker ..................... 426/502 X |
| 4,516,487 A | * | 5/1985 | Madison et al. ............. 99/450.7 |
| 4,517,785 A | * | 5/1985 | Masuda ..................... 53/211 X |
| 5,509,350 A | * | 4/1996 | Askman et al. ............. 99/450.2 |
| 6,303,165 B1 | * | 1/2001 | Karner ......................... 426/231 |
| 6,187,364 B1 | * | 2/2001 | Broberg ....................... 426/557 |

FOREIGN PATENT DOCUMENTS

| | | |
|---|---|---|
| DE | 31 51 017 | 6/1983 |
| DE | 42 01 714 | 7/1993 |
| EP | 0 643 915 | 3/1995 |
| EP | 0 830 817 | 3/1998 |
| EP | 0 882 407 | 12/1998 |
| ES | 2 112 802 | 4/1998 |
| GB | 2 130 866 | 6/1984 |

* cited by examiner

Primary Examiner—Timothy F. Simone
(74) Attorney, Agent, or Firm—Guido Modiano; Albert Josif; Daniel O'Byrne

(57) ABSTRACT

A machine for preparing food products, for example lasagne, comprising a feeder which is suitable to take a plurality of lines of product and to feed each line to a respective product conveyor; each line comprises product distribution units suitable to distribute the product in respective containers fed by a conveyance device. The product conveyors extend parallel to each other and one above the other and have different lengths, each product conveyor having a delivery end at a distribution station which is suitable to deposit the product, which arrives from the respective product conveyor, in a container which is supplied to the distribution station by the conveyance device.

17 Claims, 6 Drawing Sheets

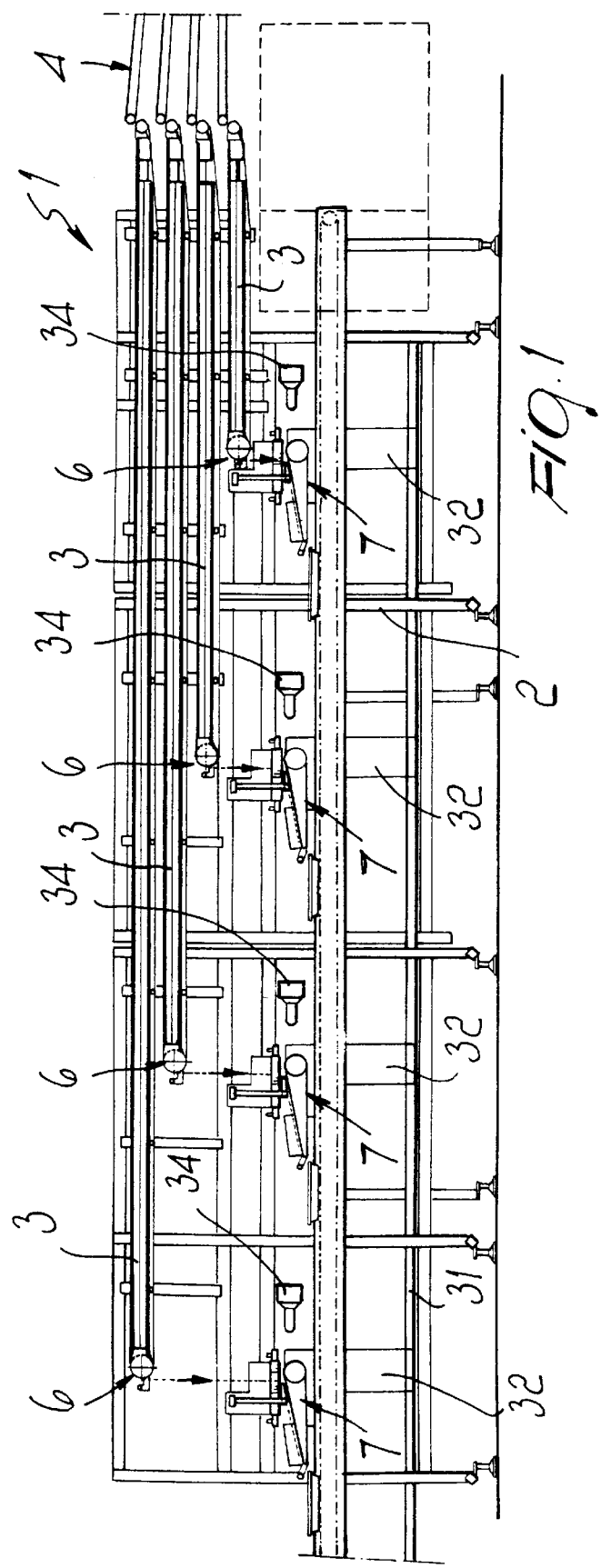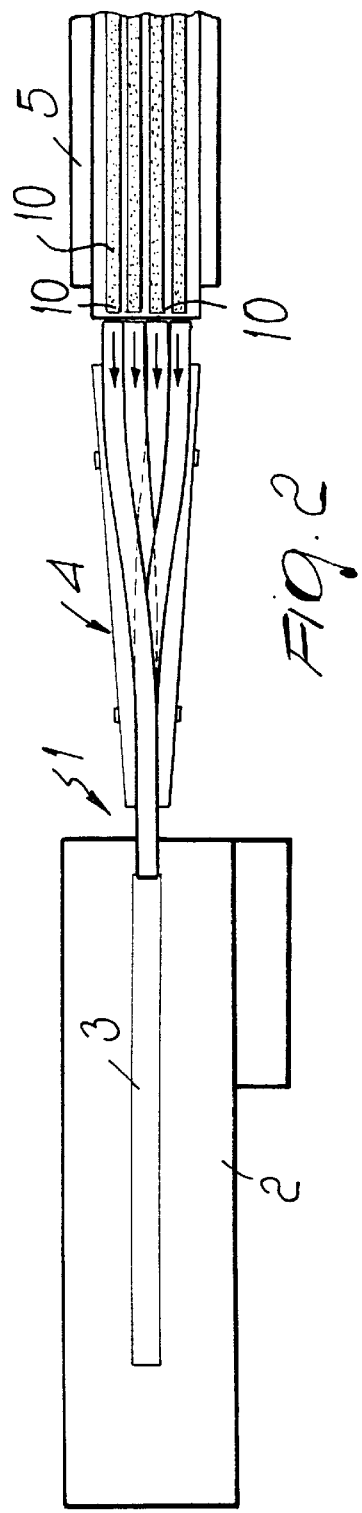

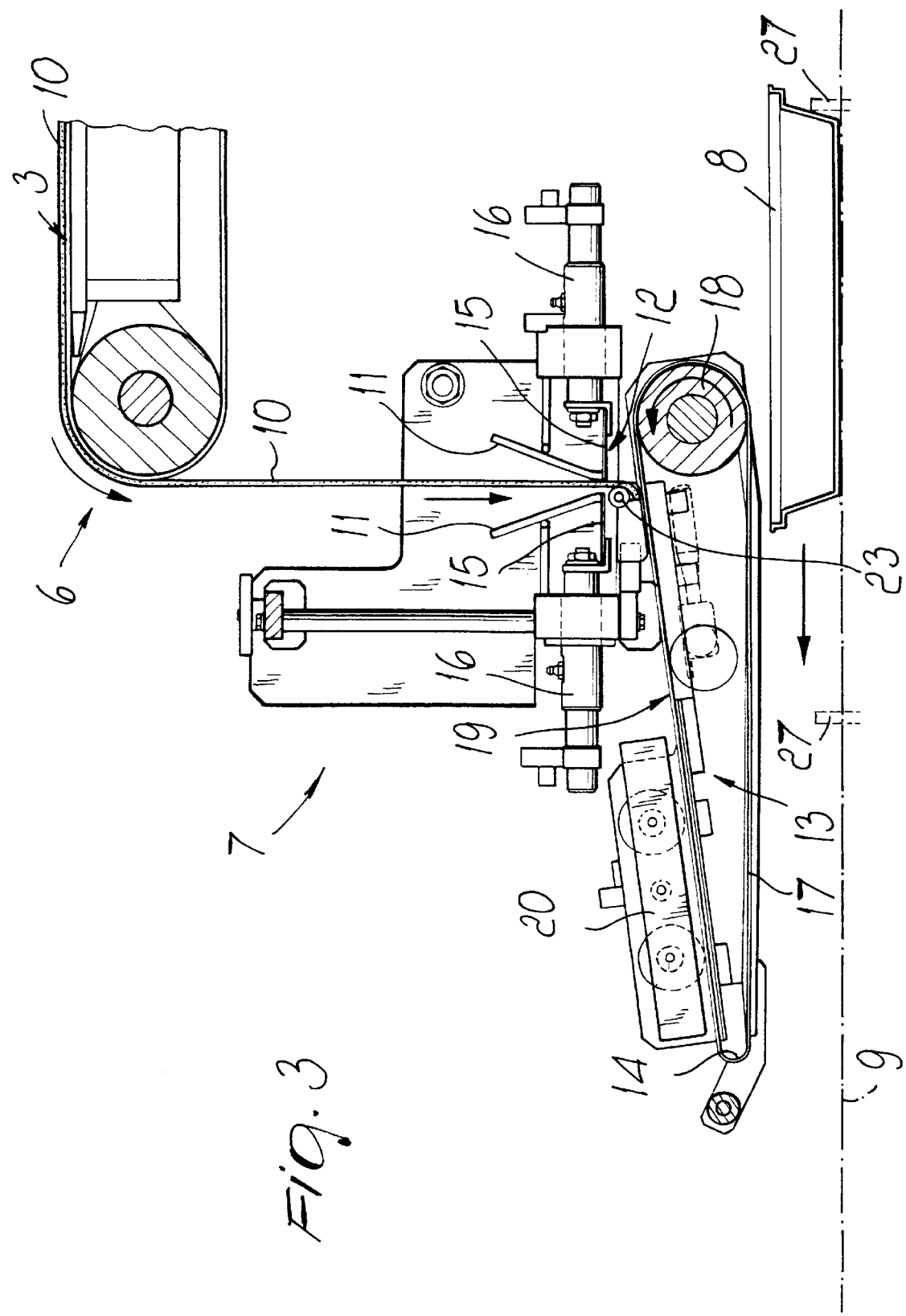

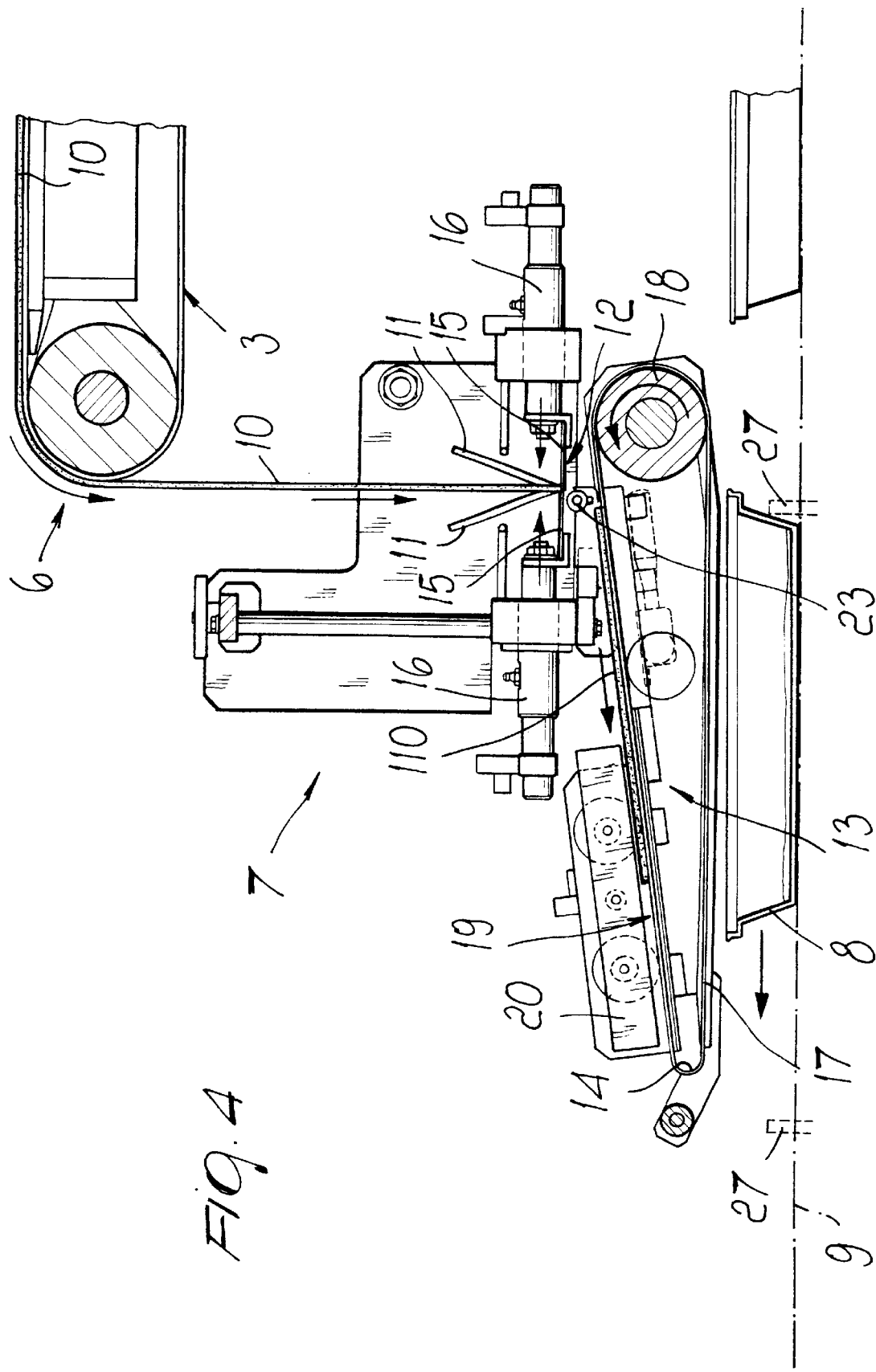

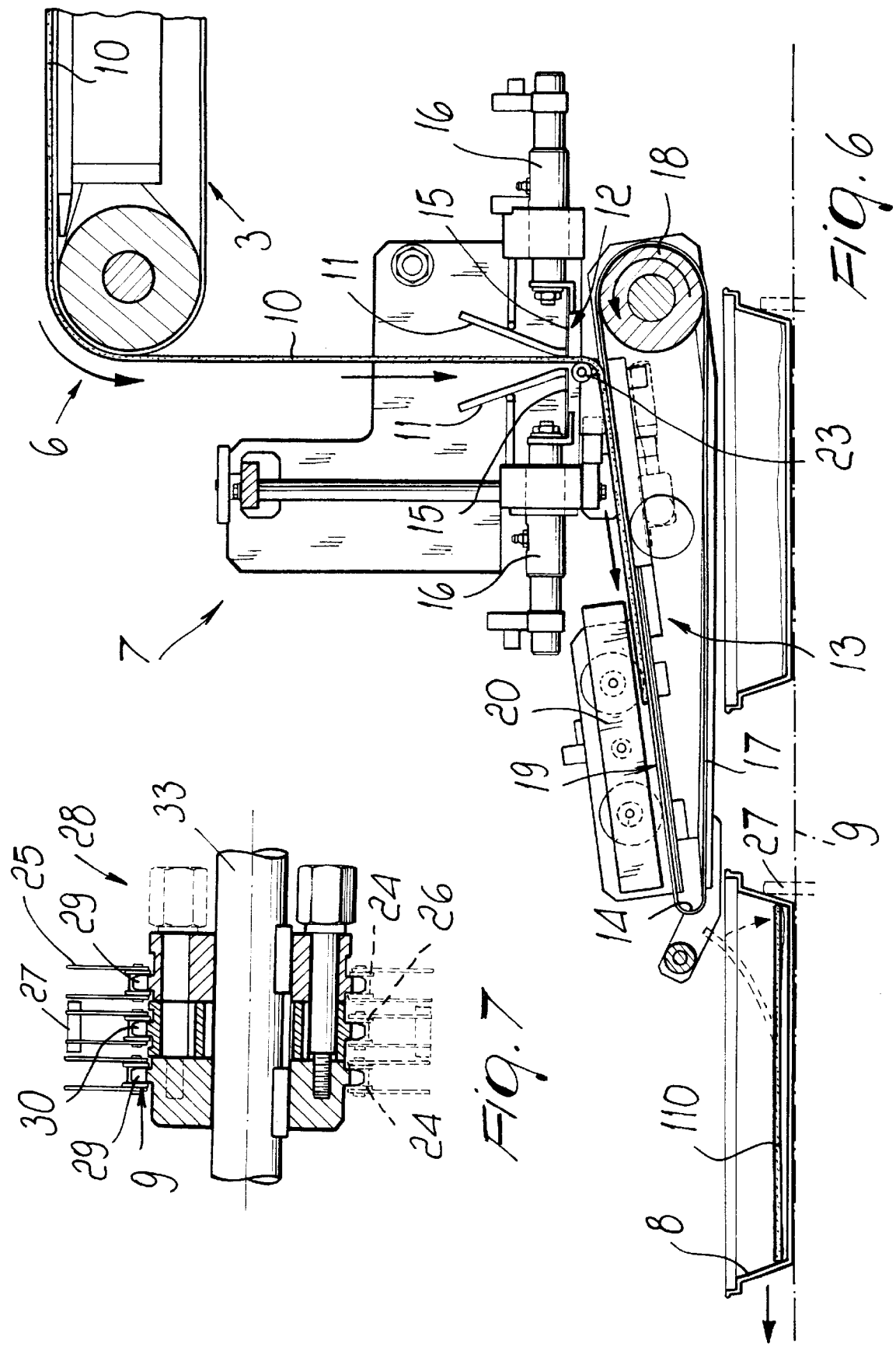

MACHINE FOR PREPARING FOOD PRODUCTS

BACKGROUND OF THE INVENTION

The present invention relates to a machine for preparing food products.

The machine for preparing food products according to the present invention is particularly but not exclusively useful for preparing products such as pasta and the like and more particularly for lasagne.

Currently, the preparation of multilayer food products, such as for example lasagne, uses devices which are unable to ensure a high production rate per unit time.

SUMMARY OF THE INVENTION

The aim of the present invention is to provide a machine for preparing food products, particularly lasagne and the like, having productivity and functionality characteristics distinctly superior to those of hitherto known machines.

Within this aim, an object of the invention is to provide a machine for preparing food products, particularly lasagne and the like, which is highly versatile and allows to vary the product being processed with simple and rapid operations.

Another object is to provide a machine for preparing food products, particularly lasagne and the like, which ensures perfect hygiene of the product during the process steps.

This aim and these and other objects which will become better apparent hereinafter are achieved by a machine for preparing food products, comprising a feeder, which is suitable to take a plurality of lines of product and to feed each one of said lines to a respective product conveyor, and means for distributing food product of each line in order to distribute such product in respective containers fed by means of a conveyance device, characterized in that said product conveyors extend parallel to each other and one above the other and have different lengths, each product conveyor having a delivery end at a distribution station which is suitable to deposit the product, which arrives from the respective product conveyor, in a container which is supplied to said distribution station by said conveyance device.

BRIEF DESCRIPTION OF THE DRAWINGS

Further characteristics and advantages of the present invention will become better apparent from the description of a preferred but not exclusive embodiment thereof, illustrated only by way of non-limitative example in the accompanying drawings, wherein:

FIG. 1 is a schematic general side elevation view of the machine for preparing food products according to the invention;

FIG. 2 is a partial plan view of the feeder of the machine for preparing food products, according to the invention;

FIGS. 3 to 6 are enlarged-scale side elevation views of a distribution means, illustrating the steps for distributing the food product in the containers;

FIG. 7 is a sectional plan view of the transmission sprocket system of the chain conveyor for the containers;

DESCRIPTION OF THE PREFERRED EMBODIMENTS

Figure 5:
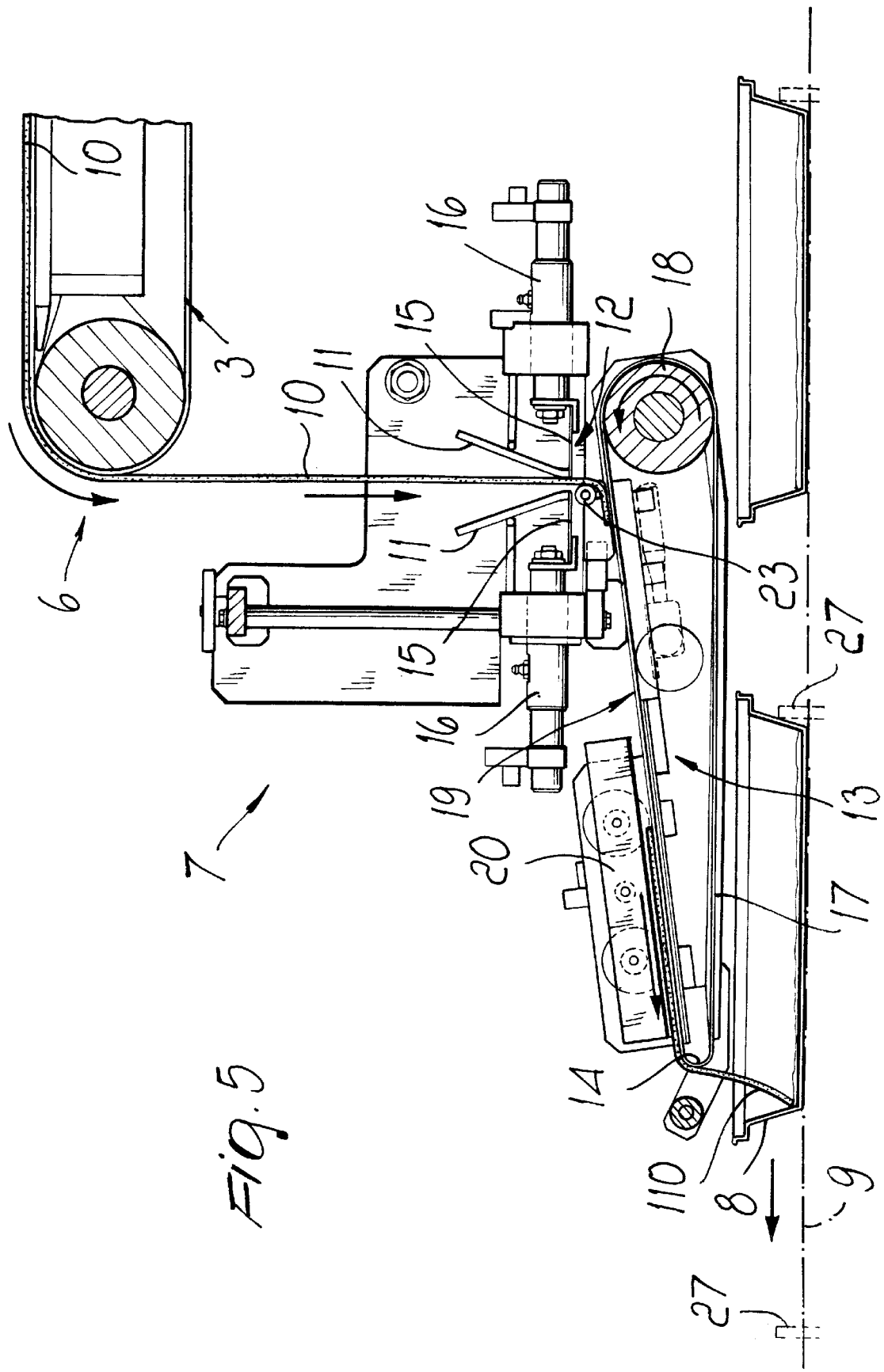

With reference to the figures, the machine for preparing food products according to the invention, generally designated by the reference numeral 1, comprises a frame 2 which supports a plurality of conveyors 3 of a food product which is fed to the product conveyors 3 by means of a feeder 4 which is suitable to take the product from a production line 5.

Each conveyor 3 consists of a conveyor belt which runs substantially longitudinally along the frame and has a first end for receiving the product and a second delivery end 6 at which there is a distribution station 7 suitable to distribute the product, which arrives from the deliver end 6 of the product conveyor 3, in a container 8 being conveyed by a container conveyor which is constituted, in the specific case, by a chain conveyor 9.

The product conveyors 3 are arranged one above the other and have different lengths, so that the delivery ends 6 are spaced one another, preferably with a uniform distance. Likewise, the corresponding distribution stations 7 are spaced, and arranged on the same plane, along the container conveyor 9.

Reference is now made, in the following, to the processing of a product constituted by pasta in the form of a continuous strip for producing, for example, lasagne, which as is known is formed of a series of layers of pasta interleaved with sauces, grated cheese, and any other selected products, such as vegetables, ham, etcetera.

The pasta in the form of a continuous strip that arrives from the production line 5 is cut longitudinally in order to form a plurality of strips of pasta 10 which are conveyed, by the feeder 4, to superimposed positions and are fed to each one of the product conveyors 3. The illustrated example shows four product conveyors 3 which are suitable to form four layers of pasta in each container 8, but it is evident to the skilled in the field that the number of product conveyors can vary according to the requirements.

The continuous strip of pasta 10 of each conveyor is fed from the delivery end 6 to the distribution station 7 by gravity, where it is received by a guiding element 11 which is assisted by a roller 23 for guiding the strip 10 into a cutting device 12. The cutting device 12 is suitable to cut the strip 10 in order to form a series of sheets 110 which are received by a receiving and unloading device 13 suitable to unload the sheet 110 in a container 8 which is conveniently arranged at the unloading end 14 of the receiving and unloading device 13.

In greater detail, the cutting device 12 comprises two blades 15, each of which is actuated by a respective actuator 16; the blades are suitable to act, with a scissor-like action, on the pasta strip 10 in order to achieve a precise and rapid cut in said strip.

The receiving and unloading device 13 comprises a conveyor belt 17 which is actuated by a pulley 18 and forms an upper inclined surface 19 on which the strip 10 and the sheet 110 generated on cutting the strip 10 are placed.

At the inclined plane 19 an expulsion device 20 is also provided, formed by a plate 21 which is actuated by actuators 22 and can move transversely on the inclined plane 19 in order to expel a sheet 110 from the distribution station 7 during machine startup, as described hereinafter.

The container conveyor 9 is suitable to supply a container 8 to each distribution station, at the unloading end 14, so that the container slides with respect to delivery end at a speed which is appropriately synchronized with the movement of the conveyor belt 17, so that the sheet 110 is laid flat inside the container.

The conveyor 9 is constituted, in the specific case, by a chain conveyor which comprises a series of evenly spaced pins for moving a plurality of containers 8.

In the illustrated example, the chain conveyor 9 comprises two lateral chains 24 provided with lateral pins 25 and a central chain 26 provided with central pins 27.

The two chains 24 and the central chain 27 are actuated by an actuation sprocket system 28 comprising two lateral sprockets 29 and a central sprocket 30. The central sprocket 30 rotates freely with respect to the lateral sprockets 29 but can be locked with respect to them in at least two positions: one in which the central pins 27 are staggered with respect to the lateral pins 25, shown for example in FIG. 8, and one in which the central pins 27 are aligned with the lateral pins 25. In this manner it is possible to adapt the conveyor 9 to different formats of the container with an extremely rapid operation consisting in releasing and locking the central sprocket 30 of the actuation sprocket system 28.

The movement of the chain conveyor 9 is synchronized with the movement of the conveyor belt 17 of each distribution station 7, and with the movement of the product conveyors 3.

Advantageously, such synchronization is achieved with a single motor (not shown) which, in addition to actuating the chain conveyor 9, through the shaft 33 on which the actuation sprocket system 28 is fixed, actuates also an actuation shaft 31 which extends under and along the chain conveyor 9 and which, by means of appropriate transmission mechanisms 32, actuates the conveyor belts 17 of the distribution stations 7 and the product conveyors 3.

In an intermediate position between the distribution stations 7, dispensing stations 34 are also provided which are suitable to dispense food products into the containers 8 conveyed by the chain conveyor 9.

The operation of the machine according to the invention is now described with reference to the preparation of lasagne and to the embodiment shown by way of an example in the drawings.

A continuous strip of pasta, produced by a production line 5, is cut longitudinally in order to generate four continuous strips of pasta 10 which are stacked by a feeder 4 so that each strip of pasta 10 is supplied to a respective product conveyor 3.

The strips of pasta 10 therefore advance simultaneously on all the conveyors 3. In steady-state operation, the first strip of pasta 10, conveyed by the lowermost conveyor 3 with reference to FIG. 1, reaches the delivery end 6 and descends into the first distribution station 7, which is the first station to the right with reference to FIG. 1.

The strip of pasta 10 is received by the guiding element 11 and, being assisted by the roller 23 and by the advancement movement, to the left with particular reference to FIGS. 3 to 6, of the inclined plane 19 of the conveyor belt 17, is deposited onto said inclined plane. At a preset time, the cutting device 12 cuts the strip 10, forming a sheet 110 which is deposited on the inclined plane 19 and is conveyed thereby, as shown in FIG. 4.

The advancement of the inclined-plane portion 19 of the conveyor belt 17 carries the sheet 110 beyond the unloading end 14, where the sheet is unloaded into a container 8 which is appropriately supplied at the right moment at the unloading end 14 by the movement of the chain conveyor 9 (FIG. 5).

The sheet of pasta 110 is adequately laid flat on the bottom of the container by the synchronized advancements of the inclined-plane portion 19 of the conveyor belt 17 and of the chain conveyor 9, as shown schematically in FIG. 6.

The container 8, in which the first sheet of pasta 110 has been laid flat, passes from a food product dispensing station 34, which dispenses a product, for example a sauce, onto the first sheet of pasta. Then the container 8 reaches the second distribution station, where a second sheet of pasta 110 is laid flat in a manner which is fully similar to what has been described for the first distribution station. The same operation is repeated in the subsequent distribution stations and dispensing stations, and at the end of the process the containers 8, complete with the prepared product, appear in succession at the leftmost end of the machine with reference to FIG. 1. The containers thus prepared can then proceed to the subsequent provided processing steps, of a per se known kind.

In the steady-state operation of the machine, these operations occur simultaneously for several containers in all the distribution stations and dispensing stations; however, depending on the type of product to be packaged, one or more of the stations or product conveyors can be deactivated in order to prepare a product with two or three layers of pasta instead of four.

At the beginning of the process, therefore before steady-state operation is reached, it is necessary to eliminate the first sheets produced by the first distribution stations, starting from the rightmost one with reference to FIG. 1, since any first sheet 110 laid flat on a first container 8 would not be able to receive a second sheet from the second station, since the second strip of pasta would not have reached yet the delivery end 6 of the second conveyor 3.

Figure 8:
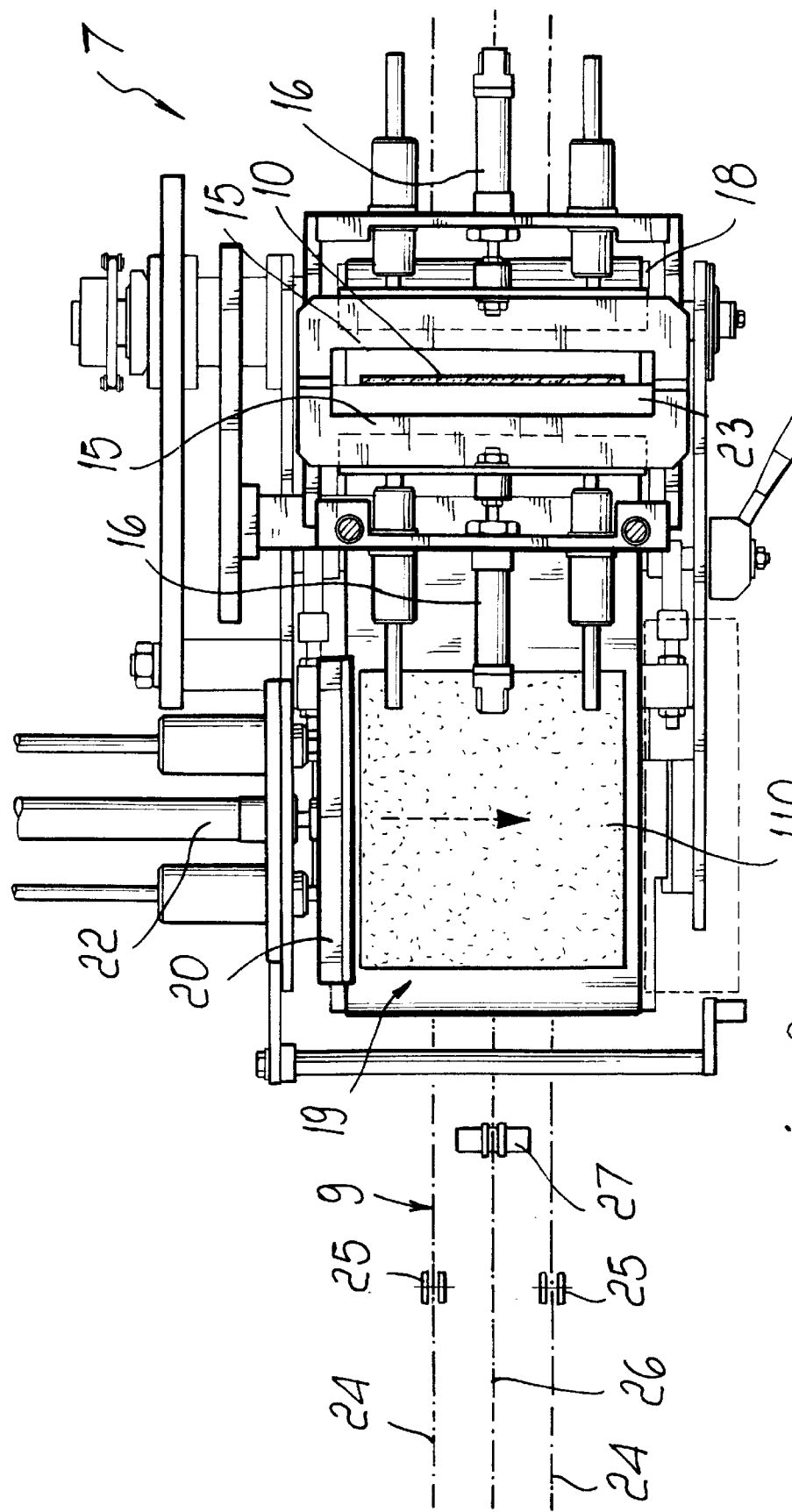
FIG. 8 is an enlarged-scale plan view of the distribution means shown in FIGS. 3 to 6.

For this reason, the expulsion devices 20 of the distribution stations are actuated in order to expel the sheets 110 toward one side of the machine, as shown schematically by an arrow in FIG. 8, so as to prevent them from falling onto the chain conveyor or in any case interfering with the subsequent steady-state operation of the machine.

The various elements of the machine that come into contact with the food products can be cleaned easily, optionally by removing them from the machine, as occurs for example for the conveyor belts of the product conveyors 3 and the conveyor belts 17 of the distribution stations 7. To these end, the guiding pulleys are fixed to a coupling which can move longitudinally in order to slacken the tension of the belt and allow the removal thereof.

In practice it has been found that the invention achieves the intended aim and objects, a machine for preparing food products, particularly lasagne and the like, having been provided which has productivity and functionality characteristics which are distinctly superior to those of the machines used up to now.

The machine according to the invention is susceptible of numerous modifications and variations, all of which are within the scope of the appended claims; all the details may further be replaced with technically equivalent elements.

The materials used, as well as the dimensions, may of course be any according to requirements and to the state of the art.

The disclosures in Italian Patent Application No. MI2000A001790 from which this application claims priority are incorporated herein by reference.

What is claimed is:

1. A machine for preparing food products, comprising a feeder, which is suitable to take a plurality of lines of product and to feed each one of said lines to a respective product conveyor, and means for distributing food product of each line in order to distribute such product in respective containers fed by means of a conveyance device, wherein said product conveyors extend parallel to each other and one above the other and have different lengths, each product conveyor having a delivery end at a distribution station which is suitable to deposit the product, which arrives from the respective product conveyor, in a container which is supplied to said distribution station by said conveyance device.

2. The machine according to claim 1, wherein the advancement motion of each one of said product conveyors and of said conveyance device is synchronized.

3. The machine according to claim 1, wherein the advancement motion of each one of said product conveyors and of said conveyance device is mechanically synchronized.

4. The machine according to claim 1, wherein each one of said product conveyors consists of a conveyor belt which is guided by pulleys actuated by motor means by way of transmission means.

5. The machine according to claim 4, wherein said transmission means comprises an actuation shaft which is actuated by said motor means and runs longitudinally of and parallel to said product conveyors and to said container conveyance device.

6. The machine according to claim 1, wherein said product conveyors are arranged one above the other and have different lengths, so that respective delivery ends thereof are mutually evenly spaced, the corresponding said distribution stations being spaced, on a same plane, along the container conveyance device.

7. The machine according to claim 1, wherein each one of said distribution stations comprises guiding means suitable to take the continuous strip of pasta, fed by the delivery end of each conveyor, to the distribution station by gravity, said guiding means being suitable to guide the strip of pasta in a cutting device, said cutting device being suitable to cut the strip in order to form a series of sheets which are received by a receiving and unloading device which is suitable to unload each sheet into a container which is arranged at an unloading end of the receiving and unloading device.

8. The machine according to claim 7, wherein said guiding means of said distribution station comprise a guiding element and a roller.

9. The machine according to claim 7, wherein said cutting device comprises two blades, each actuated by a respective actuator, which are suitable to act with a scissor-like action on the strip in order to perform precise and rapid cutting of said strip.

10. The machine according to claim 7, wherein said receiving and unloading device comprises a conveyor belt which is actuated by a pulley and forms an upper inclined plane on which the strip and the sheet generated after cutting the strip are placed.

11. The machine according to claim 10, wherein at the inclined plane an expulsion device is provided, constituted by a plate, which is actuated by actuators and can move transversely on the inclined plane in order to expel a sheet from the distribution station, at least during machine startup.

12. The machine according to claim 7, wherein said container conveyance device is suitable to supply a container to each distribution station at the unloading end, so that the container slides with respect to the delivery end with a speed which is synchronized with the movement of the conveyor belt, so that the sheet is laid flat in the container.

13. The machine according to claim 1, wherein said conveyance device consists of a chain conveyor which comprises a series of evenly spaced pins for moving a plurality of containers.

14. The machine according to claim 13, wherein said chain conveyor comprises two lateral chains provided with lateral pins and a central chain provided with central pins; said two lateral chains and said central chain being actuated by an actuation sprocket system which comprises two lateral sprockets and a central sprocket; said central sprocket being free with respect to the lateral sprockets and being lockable with respect to the lateral sprockets in at least two positions, one in which the central pins are staggered with respect to the lateral pins, and one in which the central pins are aligned with the lateral pins, thus allowing to adapt the conveyance device to various formats of the containers by means of an operation which consists in releasing and locking the central sprocket of the actuation sprocket system.

15. The machine according to claim 13, wherein the movement of the chain conveyor is synchronized with the movement of the conveyor belt, of is each distribution station, and with the movement of the product conveyors.

16. The machine according to claim 15, wherein said synchronized movements are obtained by a single motor which, in addition to actuating the chain conveyor, through a shaft on which the actuation sprocket system is fixed, actuates an actuation shaft which runs in a downward region along the chain conveyor and which, by way of appropriate transmission mechanisms, actuates the conveyor belts of the distribution stations and the product conveyors.

17. The machine according to claim 13, wherein in an intermediate position between the distribution stations dispensing stations are also provided which are suitable to dispense food products into the containers conveyed by the chain conveyor.

* * * * *